United States Patent
Tsuchiya et al.

[11] 3,856,850
[45] Dec. 24, 1974

[54] PLANT GROWTH REGULATING COMPOSITION

[75] Inventors: Hideshi Tsuchiya, Tokyo; Tetsuo Takematsu, Utsunomiya; Yoichi Hasegawa, Niigata; Masakazu Furushima, Matsudo, all of Japan

[73] Assignee: Mitsubishi Gas Chemical Company, Inc., Tokyo, Japan

[22] Filed: Apr. 11, 1972

[21] Appl. No.: 243,058

[30] Foreign Application Priority Data
Apr. 15, 1971 Japan.............................. 46-23431

[52] U.S. Cl.................. 260/501.13, 71/95, 71/113, 260/326.42
[51] Int. Cl.... C07c 103/30, C07c 103/70, C07d 27/04
[58] Field of Search...... 260/534 R, 501.13, 326.42; 71/45, 113

[56] References Cited
UNITED STATES PATENTS
3,240,799  3/1966  Hagemann et al............. 260/534 E
3,458,304  7/1969  Hagemann et al............. 260/534 E

*Primary Examiner*—Vivian Garner
*Attorney, Agent, or Firm*—Armstrong, Nikaido & Wegner

[57] ABSTRACT

The present invention relates to a novel plant growth regulating composition which is characterized in that it contains as active ingredient one or more of quaternary ammonium halide having the formula,

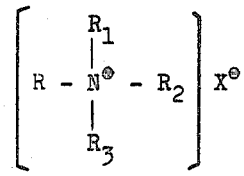

wherein R is

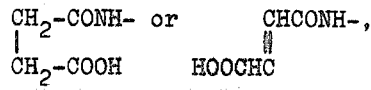

$R_1$ is methyl, ethyl or allyl group, $R_2$ and $R_3$ are both methyl or bonded to each other to form $-(CH_2)_4-$, and X is chlorine or bromine atom.

The quaternary ammonium halide have such specific biological activities on plants that plants are controlled in growth and continue to grow to effect an increase of fruit-bearing ratio, prevention of Jonathan spot or Jonathan freckle on apple fruit, improvement of fruit qualities after harvest and the like.

3 Claims, No Drawings

PLANT GROWTH REGULATING COMPOSITION

This invention relates to novel plant growth regulating compositions containing as active ingredient one or more of new compounds represented by the general formula,

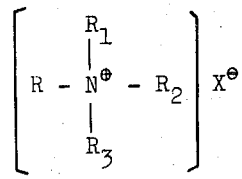

wherein R is

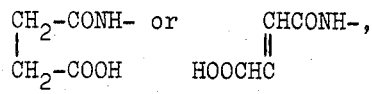

$R_1$ is methyl, ethyl or allyl group, $R_2$ and $R_3$ are both methyl groups or may bond to each other to form $-(CH_2)_4-$, and X is a chlorine or bromine atom. The compositions of the present invention are used for such various purposes as the increase in fruit-bearing ratio, the prevention of degradation in quality of fruits, the prevention of physiological diseases of apple, the prevention of cold and drought damages of plants, the obtainment of excellent ornamental garden flowers, etc.

Plant growth regulating chemicals have such actions as to promote or control the functions of plants which bring about such physiological phenomena as germination, root-taking, elongation, flower and differentiation, flowering, fructification and fruit-falling. Recently, therefore, many attempts have been made to carry out with advantages the cultivation of plants by use of such chemicals as mentioned above. For example, there have been made attempts to increase cold resistance, drought resistance and disease resistance to plants or to make leaf colors and fruit colors favorable by use of chemicals having actions to regulate the growth of plants. These chemicals, however, have such drawbacks that in case the chemicals are used at somewhat high concentrations or are mixed with other chemicals, they not only tend to cause phytotoxicity but also deteriorate the taste of fruits and inhibit the thickening of fruits.

The compositions of the present invention have actions to regulate the growth of plants. In the cultivation of fruit trees, therefore, they can be used for the purpose of making the trees smaller to facilitate the pomicultural operation or to increase the yield of crops. Furthermore, the present compositions have actions to inhibit the useless growth of plants to make the plants grow strongly, so that they can be used for such purposes as the prevention of cold or drought damage of plants, the prevention of falling of fruits, the increases in number of flower buds, the promotion of coloration of fruits, and the prevention of Jonathan spot or Jonathan freckle which is physiological disease of apple. When the present compositions are applied to ornamental garden plants, it is possible to obtain excellent ornamental plants which have been shortened in leaf internode without any deformity of leaves and flowers. For example, when the present compositions are applied to chrysanthemums, it is possible to obtain excellent ornamental ones. In case the seedlings of cucumber (*Cucumis sativus* L.) are cultivated in a greenhouse in winter, the seedlings sometimes grow uselessly to become weak due to insufficient sunlight. However, when the seedlings are treated with the present compositions, they can be made short in leaf internode and made strong even in a greenhouse in winter. It is also possible to spray the present compositions to fruit trees in order to save the operation of pruning. Further, the present compsitions have such characteristic that they do not cause any phytotoxicity even when applied to plants which have been sprayed with a bordeaux mixture.

The compound used as active ingredient of the present composition is soluble in water, alcohols, dimethylformamide, or the like, and hence is ordinarily used in such a manner that the compound is dissolved in water, and the resulting solution is incorporated with a surface active agent and then sprayed to plants so as to sufficiently wet the leaves, stems and fruits thereof, or in such a manner that seeds of plants are immersed in an aqueous solution of the present compound and the thus treated seeds are sowed.

In pomiculture, a 500 to 10,000 p.p.m. solution of the present compound is sprayed to fruit trees 1 to 2 times during a period between 30 days before flowering and 100 days after flowering. To apple trees, for example, a 500 to 2,000 p.p.m. aqueous solution of the present compound is sprayed 1 to 2 times during May to July. To grape vines, a 0.2 to 1.0% aqueous solution of the present compound is sprayed 1 to 2 times during May to June. In the culture of flowering plants or vegetables, a solution of the present compound at a concentration of about 0.2 to 0.85 % is sprayed to the seedlings thereof so as to sufficiently wet the seedlings, or seeds of said plants or vegetables are immersed in said solution and are then sowed.

The compounds used as active ingredients of the present plant growth regulating compositions are as shown in Table 1, though these are not limitative.

Table 1

| Compound No. | Formula | m.p. |
|---|---|---|
| 1 | $\left[\begin{array}{c} CH_2-CONH-\overset{\overset{\displaystyle CH_3}{\mid}}{\underset{\underset{\displaystyle CH_3}{\mid}}{N^{\oplus}}}-CH_3 \\ \mid \\ CH_2-COOH \end{array}\right] Cl^{\ominus}$ | 136–138°C. |
| 2 | $\left[\begin{array}{c} CH_2-CONH-\overset{\overset{\displaystyle CH_3}{\mid}}{\underset{\underset{\displaystyle CH_3}{\mid}}{N^{\oplus}}}-CH_3 \\ \mid \\ CH_2-COOH \end{array}\right] Br^{\ominus}$ | 140–143°C. (decomposition) |

Table I — Continued

| # | Structure | Counterion | m.p. |
|---|---|---|---|
| 3 | [CH₂-CONH-N⁺(CH₃)(C₂H₅)(CH₃)-CH₂-COOH] | Cl⁻ | 121°C. |
| 4 | [CH₂-CONH-N⁺(CH₃)(C₂H₅)(CH₃)-CH₂-COOH] | Br⁻ | 141°C. (decomposition) |
| 5 | [CH₂-CONH-N⁺(CH₃)(CH₂-CH=CH₂)(CH₃)-CH₂-COOH] | Cl⁻ | 134°C. (decomposition) |
| 6 | [CH₂-CONH-N⁺(CH₃)(CH₂-CH=CH₂)(CH₃)-CH₂-COOH] | Br⁻ | 144°C. (decomposition) |
| 7 | [CH₂-CONH-N⁺(CH₃)(pyrrolidinyl)-CH₂-COOH] | Cl⁻ | 54–56°C. |
| 8 | [CH₂-CONH-N⁺(CH₃)(pyrrolidinyl)-CH₂-COOH] | Br⁻ | 116–120°C. |
| 9 | [CH₂-CONH-N⁺(C₂H₅)(pyrrolidinyl)-CH₂-COOH] | Cl⁻ | 142–144°C. |
| 10 | [CH₂-CONH-N⁺(C₂H₅)(pyrrolidinyl)-CH₂-COOH] | Br⁻ | |
| 11 | [CH₂-CONH-N⁺(CH₂-CH=CH₂)(pyrrolidinyl)-CH₂-COOH] | Cl⁻ | |

Table 1 — Continued

| | Structure | Anion | Melting point |
|---|---|---|---|
| 12 | [CH₂-CONH-N⁺(CH₂-CH=CH₂)(pyrrolidine ring); CH₂-COOH] | Cl⁻ | 123–124°C. |
| 13 | [CHCONH-N⁺(CH₃)₃; HOOCHC=] | Cl⁻ | 175–176°C. (decomposition) |
| 14 | [CHCONH-N⁺(CH₃)₃; HOOCHC=] | Br⁻ | |
| 15 | [CHCONH-N⁺(CH₃)₂(C₂H₅); HOOCHC=] | Cl⁻ | |
| 16 | [CHCONH-N⁺(CH₃)₂(C₂H₅); HOOCHC=] | Br⁻ | 188°C. (decomposition) |
| 17 | [CHCONH-N⁺(CH₃)₂(CH₂-CH=CH₂); HOOCHC=] | Cl⁻ | |
| 18 | [CHCONH-N⁺(CH₃)₂(CH₂-CH=CH₂); HOOCHC=] | Br⁻ | 130–132°C. (decomposition) |
| 19 | [CHCONH-N⁺(CH₃)(pyrrolidine); HOOCHC=] | Cl⁻ | 180–184°C. |
| 20 | [CHCONH-N⁺(CH₃)(pyrrolidine); HOOCHC=] | Br⁻ | |
| 21 | [CHCONH-N⁺(C₂H₅)(pyrrolidine); HOOCHC=] | Cl⁻ | 161–165°C. |

Table 1—Continued

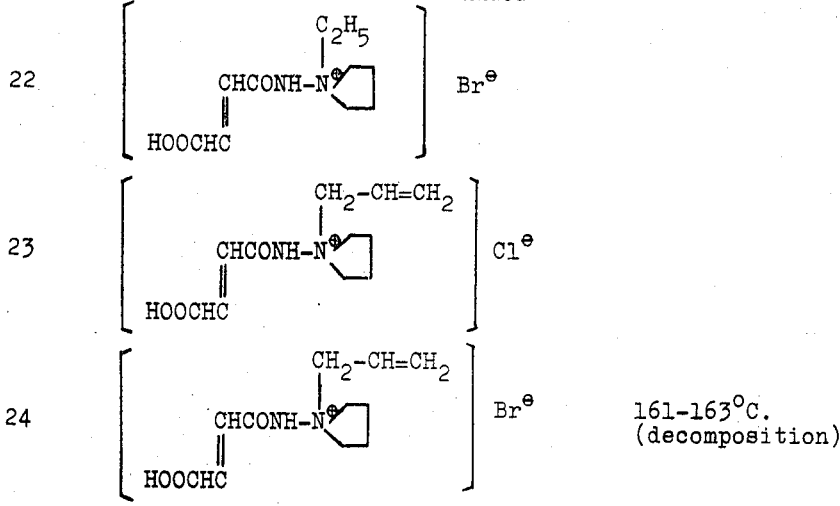

| 22 | [structure with $C_2H_5$, CHCONH-N⟨pyrrolidyl⟩, HOOCHC] | Br⁻ | |
| 23 | [structure with $CH_2-CH=CH_2$, CHCONH-N⟨pyrrolidyl⟩, HOOCHC] | Cl⁻ | |
| 24 | [structure with $CH_2-CH=CH_2$, CHCONH-N⟨pyrrolidyl⟩, HOOCHC] | Br⁻ | 161–163°C. (decomposition) |

The compounds which are active ingredients of the present plant growth regulating compositions can be easily synthesized by reacted amidic acids with halogenated alkyls as shown in the following examples:

EXAMPLE 1

Synthesis of the compound 1:

To a solution of 20 g. (0.125 mole) of N-(dimethylamino) succinamic

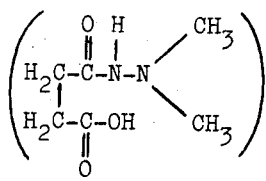

acid in ethanol was added 21.4 g. (0.15 mole) of methyl iodide, and the resulting mixture was refluxed for 2 hours. After completion of the reaction, excess methyl iodide and the ethanol were removed from the reaction product by means of evaporation to obtain 36.5 g. of a syrup-like substance. This substance was dissolved in a saturated aqueous solution of 17 g. (0.0625 mole) of mercuric chloride to precipitate a red mercuric iodide. The precipitate was removed by filtration, and the water in the filtrate was removed by means of evaporation. Subsequently, the residue was recrystallized from acetone to obtain 25.8 g. of crystals.

EXAMPLE 2

Synthesis of the compound 2:

A mixture comprising 3.2 g. of N-(dimethylamino) succinamic acid of 6.05 g. of methyl bromide and methanol was tightly sealed in an autoclave and reacted at 60°C. for 11 hours. Thereafter, the reaction liquid was taken out of the autoclave, and the methanol and excess methyl bromide were removed by distillation. The residue obtained was washed with a mixture of acetone and a small amount of methanol to obtain 2.0 g. of a white solid, m.p. 140°–143°C., purity 98.2 % as measured by titration.

EXAMPLE 3

Synthesis of the compound 21:

A mixture comprising 5.6 g. of N-(1-pyrrolidyl) fumaramic acid, 5.2 g. of ethyl iodide and 50 cc. of methanol was refluxed for 15 hours. Subsequently, the methanol and excess ethyl iodide were removed by distillation to obtain 9.7 g. of a pale brown oily residue. This residue was dissolved in water, and the resulting solution was charged with an aqueous solution containing 4.1 g. of mercuric chloride to deposit a red precipitate of mercuric iodide. The precipitate was removed by filtration, and then hybrogen sulfide was introduced into the filtrate to precipitate the residual mercuric ion as a mercuric sulfide. This precipitate was removed by filtration, and the water in the filtrate was removed by distillation under reduced pressure, whereby about 7.4 g. of an oily substance was obtained. Subsequently, the oily substance was washed with acetone and then with a small amount of methanol to obtain 2.7 g. of a white powder, m.p. 161°–165°C., purity of about 100 % as measured by titration.

Procedures for preparation of the present compositions and effects thereof are shown below with reference to examples.

EXAMPLE 4

Synthesis of the compound 24:

A mixture comprising 1.8 g. of N-(1-pyrrolidyl) fumaramic acid

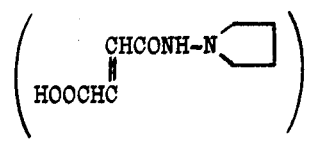

1.2 g. (0.01 mole) of allyl bromide and 20 ml of acetonitrile was refluxed for 3 hours. Subsequently, the acetonitrile was removed by distillation. The residue was recrystallized from acetone to obtain 2.5 g. of a white crystal, m.p. 161°–163°C decomposed, purity 97 % as measured by titration.

EXAMPLE 5

Test areas were provided on individual main branches of one apple tree (Malus pumila Miller). On the other hand, each of the compound 19 and 1 of the present invention was formed respectively into an aqueous solution of a given concentration, and the solution was incorporated with a spreader. The aqueous solution was sprayed to the test areas by means of a semi-automatic sprayer so as to sufficiently wet the leaves and fruits of the apple tree. Thereafter, each length of the shoots was measured. The results obtained were as shown in Table 2.

Table 2

|  | Variety | Concentration (p.p.m.) | At the time of spraying Date | Length (cm) | At the time of measurement Date | Length (cm) | Elongation (cm) | Elongation ratio (%) |
|---|---|---|---|---|---|---|---|---|
| Compound 19 | STARKING | 1,000 | June 30 | 25.3 | Sept. 20 | 46.2 | 20.9 | 44.1 |
|  |  | 1,500 | do. | 28.6 | do. | 47.0 | 18.4 | 39.0 |
| Control |  | — | do. | 30.5 | do. | 77.9 | 47.4 | 100.0 |
| Compound 1 | JONATHAN | 1,000 | July 20 | 15.5 | Oct. 25 | 24.9 | 9.4 | 55.0 |
| Control |  | — | do. | 15.1 | do. | 32.3 | 17.2 | 100.0 |

The apple tree treated with the present composition was less in number of uselessly elongated branches, and the shape thereof was markedly favorable from the standpoint of apple tree cultivation as shown in the following examples wherein the spreader having the following composition was used.

Spreader:

| Alkylaryl polyglycol ether | 20.0 % |
| Sodium dinaphthylmethanesulfonate | 6.0 % |
| Organic solvent | 74.0 % |

EXAMPLE 6

Test areas were provided on individual main branches of one apple tree (variety: JONATHAN). On July 20, a 0.1 % aqueous solution of the present compound 1 which had been incorporated with a wetting agent was sprayed to the test areas by means of a semi-automatic sprayer so as to sufficiently wet the leaves and fruits of the apple tree. Thereafter, the extent of damages of each area due to Jonathan spot and Jonathan freckle was investigated. The results obtained were as shown in Table 3.

EXAMPLE 7

Test areas were provided on individual main branches of one apple tree. Subsequently, each of aqueous solutions of the present compounds 19 and 1 at given concentrations was sprayed to the test areas by means of a semi-automatic sprayer, so as to sufficiently wet the leaves and fruits of the apple tree. Falling ratios of the fruits before harvest were as shown in Table 4.

Table 4

|  | Variety | Day of spraying | Concentration (p.p.m.) | Falling ratio (%) |
|---|---|---|---|---|
| Compound 19 | STARKING | June 30 | 1,000 | 5.3 |
|  |  | do. | 1,500 | 3.9 |
| Non-treatment |  | do. | — | 12.8 |
| Compound 1 | JONATHAN | July 20 | 1,000 | 2.5 |
| Non-treatment |  | do. | — | 8.7 |

EXAMPLE 8

The same treatment as in Example 7 was effected, and the apple fruits gathered at the harvest time were stored at room temperature to investigate the variation in quality of the fruits. The reslts obtained were as set forth in Table 5.

Table 5

| Time of investigation | Test area | Variety | Concentration (p.p.m.) | Hardness* (lbs.) | Saccharinity(°)** | Acidity*** (cc) |
|---|---|---|---|---|---|---|
| At the time of harvest (Oct. 10) | Compound 1 | JONATHAN | 1,000 | 13.7 | 13.7 | 11.5 |
|  | Non-treatment | do. | — | 13.0 | 13.4 | 11.4 |
| 60th Day after harvest | Compound 1 | do. | 1,000 | 13.1 | 13.7 | 11.4 |
|  | Non-treatment | do. | — | 11.2 | 13.4 | 7.6 |
| At the time of harvest (Oct. 15) | Compound 19 | STARKING | 1,000 | 16.1 | 14.0 | 11.2 |
|  | do. | do. | 1,500 | 16.9 | 13.4 | 11.3 |
|  | Non-treatment | do. | — | 14.5 | 14.5 | 11.1 |
| 30th Day after harvest | Compound 19 | do. | 1,000 | 10.4 | 14.2 | 11.0 |
|  | do. | do. | 1,500 | 11.0 | 13.6 | 11.1 |
|  | Non-treatment | do. | — | 7.8 | 14.6 | 7.2 |

* Hardness: Magnes-Taylor pressure tester, with a 7/16 inch tip (lbs.).
** Saccharinity: Indication of refracrometer.
*** Acidity: Amount of one-tenth N NaOH required for neutralizing 10 cc of juice.

Table 3

| Area | Day of Investigation | Damages (%) | | | |
|---|---|---|---|---|---|
|  |  | Severe | Great | Medium | Slight |
| Compound 1 | Oct. 5 | 0 | 0 | 0 | 0 |
|  | Oct. 15 | 0 | 0 | 0 | 0 |
|  | Oct. 25 | 0 | 0 | 0 | 2 |
| Non-treatment | Oct. 5 | 0 | 0 | 0 | 0 |
|  | Oct. 15 | 2 | 7 | 10 | 11 |
|  | Oct. 25 | 19 | 62 | 6 | 3 |

Note: Damages (%) were calculated by (Damaged number of fruits/Total number of fruits in respective area × 100)

On the 60th day after the harvest, the apple fruits were sampled. As the result, the apple fruits from the control area were extremely inferior in taste, whereas the apple fruits from the areas treated with each of the present compounds 1 and 19 were as excellent in taste as those at the time of harvest.

EXAMPLE 9

Each of the present compounds 3 and 9 was formed into a given concentration aqueous solution, which was then incorporated with a wetting agent. Subsequently, the solution was sprayed to the shoots of grape vines (variety: KYOHO) so as to sufficiently wet the shoots.

Two weeks after the spraying, the lengths of the shoots were measured. The results obtained were as shown in Table 6.

Table 6

| Test area | Day of spraying | Concentration (%) | Length before treatment (cm) | Length after 2 weeks from treatment (cm) | Elongation of branch (cm) | Elongation ratio (%) |
| --- | --- | --- | --- | --- | --- | --- |
| Compound 3 | June 7 | 1 | 90 | 133 | 43 | 57 |
|  |  | 0.5 | 87 | 141 | 54 | 72 |
| Non-treatment | — | — | 89 | 164 | 75 | 100 |
| Compound 9 | June 1 | 1 | 85 | 121 | 36 | 49 |
|  |  | 0.5 | 90 | 137 | 47 | 64 |
| Non-treatment | — | — | 81 | 154 | 73 | 100 |

The grape vines sprayed with the present compositions did not show any useless elongation of shoots, did not require pruning, and had shapes quite favorable from the standpoint of viticulture.

EXAMPLE 10

10 Seeds of Black valentine bean (*Phaseolus Vulgaris* L) were sowed in a vat of 800 cm² at 27°C. When the primary leaves were partially expanded (3.5–5 cm across) and the trifoliolate leaves were still folded in the terminal bud, each of aqueous solutions of the present compounds 7, 8, 9 and 19 which had been incorporated with a spreader was uniformly sprayed to the seedlings. 7 Days after the spraying, the length from the second node to the tip of bud was measured and the phytotoxicities of the compounds were investigated. The results obtained were as shown in Table 7.

The compositions of the present invention had no phytotoxicity at all on the seedlings.

EXAMPLE 11

Seeds of Black valentine bean (*Phaseolus vulgaris* L) were immersed in an aqueous solution of the present compound 9 which had been incorporated with a spreader. After 10 hours, the seeds were taken out, sufficiently washed with water and then sowed in a soil. 12 Days after the sowing, the height of each seedling was measured and the phytotoxicity of the compound was investigated. The results obtained were as shown in Table 8. As is clear from Table 8, it was confirmed that even in the case of seed treatment, the present compound displays its plant regulating effect and has no phytotoxicity.

Table 8

| Compound No. | Concentration (p.p.m.) | Height (cm) | Elongation ratio (%) | Phytotoxicity |
| --- | --- | --- | --- | --- |
|  | 2,000 | 4.5 | 25 | None |
| 9 | 1,000 | 7.0 | 39 | do. |
|  | 500 | 9.5 | 53 | do. |
| Non-treatment | — | 18.0 | 100 | do. |

EXAMPLE 12

Test areas were provided on individual main branches of grape vines (variety: KYOHO). On the other hand, each of the present compounds 2, 9 and 21 was formed into a given concentration solution. On May 21st, the solution was sprayed by means of a small size manual sprayer to the reverse sides of the leaves. On July 7, the lengths of shoots and the number of berries per cluster were counted. The results obtained were as set forth in Table 9. In all the test areas to which the present compositions had been applied, the grape vines did not differ in time of flowering and Table 9

| Compound No. | Concentration (%) | Length of shoots (cm) | | | Ratio of length (%) | Berries | |
| --- | --- | --- | --- | --- | --- | --- | --- |
| | | At the time of treatment | On July 7 | Elongation | | Number of berries per cluster | Ratio (%) |
| 2 | 0.75 | 20.0 | 89.0 | 69.0 | 85 | 29.2 | 153 |
|  | 0.5 | 19.0 | 92.0 | 73.0 | 90 | 27.3 | 144 |
| 9 | 0.75 | 21.5 | 91.5 | 70.0 | 86 | 28.9 | 152 |
|  | 0.5 | 19.5 | 94.5 | 75.0 | 93 | 25.7 | 135 |
| 21 | 0.75 | 19.0 | 84.0 | 65.0 | 80 | 35.1 | 185 |
|  | 0.5 | 20.5 | 89.0 | 69.5 | 86 | 30.3 | 159 |
| Non-treatment | — | 20.0 | 101.0 | 81.0 | 100 | 19.0 | 100 |

Table 7

| Compound No. | Concentration (%) | Elongation (cm) | Elongation ratio (%) | Phytotoxicity |
| --- | --- | --- | --- | --- |
|  | 1 | 1.0 | 25 | None |
|  | 0.5 | 1.4 | 35 | do. |
| 7 | 0.25 | 2.4 | 60 | do. |
|  | 0.125 | 3.1 | 78 | do. |
|  | 1 | 2.5 | 63 | do. |
| 8 | 0.5 | 2.7 | 68 | do. |
|  | 1 | 0.7 | 18 | do. |
|  | 0.5 | 0.9 | 23 | do. |
| 9 | 0.25 | 1.0 | 25 | do. |
|  | 0.125 | 1.8 | 45 | do. |
|  | 1 | 0.8 | 20 | do. |
|  | 0.5 | 1.1 | 28 | do. |
| 19 | 0.25 | 1.9 | 48 | do. |
|  | 0.125 | 2.1 | 53 | do. |
| Non-treatment | — | 4.0 | 100 | do. | in number of leaves, were inhibited in elongation of shoots, and were increased in number of berries.

EXAMPLE 13

In a flower pot were planted 3 chrystanthemum plants (var. Bright Golden Princess Anne.) 14 Days after the plantation, leaf buds of the plants were pinched off, and each of given concentration chemicals of the present compounds shown in Table 10 was sprayed to the plants. 70 Days after the spraying investigation was made with respect to the elongation state of stem, the flowering time, the size of flower and the shape of flowering plant. The elongation state of stem was as shown in Table 10.

In each of the present chemical-treated plants, the length of stem was about 2 to 10 cm. shorter than in the

Table 11

| Compound No. | Concentration (%) | Height at the time of treatment (cm) | Height after 40 days (cm) | Elongation during 40 days (cm) | Ratio of elongation to that in non-treated area (cm) | Phytotoxicity |
|---|---|---|---|---|---|---|
| 2 | 0.5 | 16.7 | 26.9 | 10.2 | 64 | None |
|   | 0.25 | 16.3 | 28.6 | 12.3 | 77 | do. |
| 8 | 0.5 | 16.0 | 26.9 | 10.9 | 68 | do. |
|   | 0.25 | 16.1 | 29.1 | 13.0 | 81 | do. |
| 9 | 0.5 | 16.7 | 26.0 | 9.3 | 58 | do. |
|   | 0.25 | 16.0 | 26.5 | 10.5 | 66 | do. |
| 13 | 0.5 | 16.0 | 28.5 | 12.5 | 78 | do. |
|   | 0.25 | 16.7 | 31.0 | 14.3 | 89 | do. |
| 19 | 0.5 | 16.3 | 24.8 | 8.5 | 53 | do. |
|   | 0.25 | 15.9 | 25.3 | 9.4 | 59 | do. |
| 21 | 0.5 | 16.5 | 24.0 | 7.5 | 47 | do. |
|   | 0.25 | 16.3 | 25.0 | 8.7 | 54 | do. |
| 24 | 0.5 | 16.6 | 28.8 | 12.2 | 76 | do. |
|   | 0.25 | 16.2 | 31.0 | 14.8 | 92 | do. |
| Non-treatment | — | 16.3 | 32.3 | 16.0 | 100 | do. |

Table 10

| Compound No. | Concentration (%) | Length of stem (cm) At the time of treatment | 70 Days after treatment |
|---|---|---|---|
| 1 | 0.8 | 6.5 | 20.0 |
|   | 0.4 | 6.5 | 23.0 |
| 4 | 0.8 | 6.0 | 20.5 |
|   | 0.4 | 6.5 | 24.0 |
| 5 | 0.8 | 6.0 | 17.5 |
|   | 0.4 | 6.0 | 22.3 |
| 7 | 0.8 | 6.5 | 19.0 |
|   | 0.4 | 6.5 | 23.5 |
| 8 | 0.8 | 6.0 | 19.0 |
|   | 0.4 | 6.5 | 21.5 |
| 12 | 0.8 | 6.5 | 23.0 |
|   | 0.4 | 6.5 | 25.0 |
| 13 | 0.8 | 6.5 | 16.0 |
|   | 0.4 | 6.5 | 19.0 |
| 16 | 0.8 | 6.0 | 17.0 |
|   | 0.4 | 6.5 | 24.0 |
| 18 | 0.8 | 6.0 | 18.5 |
|   | 0.4 | 6.0 | 21.0 |
| 21 | 0.8 | 6.0 | 14.0 |
|   | 0.4 | 6.5 | 15.5 |
| 24 | 0.8 | 6.5 | 20.0 |
|   | 0.4 | 6.5 | 24.0 |
| Non-treatment | — | 6.5 | 27.5 |

EXAMPLE 14 non-treated plant, and the flowering time, and the size, color and shape of flower did not differ from those in the non-treated area. As to the shape of flowering plant, however, the plants in the non-treated area were great in height and were not suitable for ornamental purposes.

A bordeaux mixture (copper sulfate : quick lime : water was 1 : 2 : 320 by weight) was sprayed to seedlings of cucumber (*Cucumis sativus* L). On the next day, 0.5 % aqueous solution of the present compound 21 was sprayed thereto. After 2 weeks, investigation was made with respect to phytotoxicity to find that the present composition showed no phytotoxicity even when applied quickly after spraying of the bordeaux mixture. Of course, no phytotoxicity was observed in the non-treated plants, which had been sprayed only with the bordeaux mixture.

EXAMPLE 15

Effects of the present compounds on poinsettias (*Euphorbia pulcherrima* WILLDENOW):

Poinsettia plants (red), which had grown to about 15 cm., were transplanted in pots in a proportion of 3 plants per pot. 3 Days after the transplantation, each of given concentration aqueous solutions of the present compounds shown in Table 11 was sprayed by means of a microsprayer onto the surfaces of leaves of the plants. 40 Days after the spraying, the height of each plant was measured. The results obtained were as shown in Table 11. The treated plants were lower in height than those in the non-treated plants, and were suitable for ornamental potted plants.

We claim:
1. A quaternary ammonium halide having the formula,

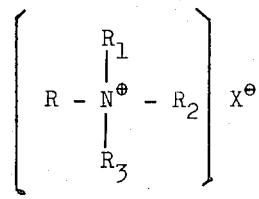

wherein R is
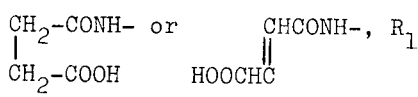
$R_1$ is methyl, ethyl or allyl group, $R_2$ and $R_3$ are both methyl or bonded to each other to form $-(CH_2)_4-$, and X is chlorine or bromine atom.
2. A quaternary ammonium halide according to claim 1, wherein R is
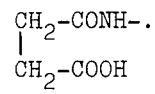
3. A quaternary ammonium halide according to claim 1, wherein R is
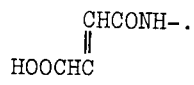
* * * * *